United States Patent
Ahn et al.

(10) Patent No.: US 8,113,761 B2
(45) Date of Patent: Feb. 14, 2012

(54) SUPPORT PLATFORM OF NON-CONTACT TRANSFER APPARATUS

(75) Inventors: Sang Eon Ahn, Paju-si (KR); Hyun Joo Jeon, Daegu-si (KR); Hwan Kyu Yoo, Osan-si (KR); Ji Young Oh, Seoguipo-si (KR); Cheon Soo Lee, Paju-si (KR)

(73) Assignees: LG Display Co., Ltd., Seoul (KR); AVACO Co., Ltd., Daegu-si (KR); LG Electronics Inc., Seoul (KR)

( * ) Notice: Subject to any disclaimer, the term of this patent is extended or adjusted under 35 U.S.C. 154(b) by 220 days.

(21) Appl. No.: 11/454,868

(22) Filed: Jun. 19, 2006

(65) Prior Publication Data
US 2006/0284042 A1    Dec. 21, 2006

(30) Foreign Application Priority Data
Jun. 20, 2005   (KR) .................. 10-2005-0052916

(51) Int. Cl.
    *B65G 35/00* (2006.01)
(52) U.S. Cl. ............. 414/676; 248/631; 34/460; 406/88
(58) Field of Classification Search .................. 248/631; 34/460; 65/25.2; 406/86, 88; 414/676
See application file for complete search history.

(56) References Cited

U.S. PATENT DOCUMENTS

| | | | | |
|---|---|---|---|---|
| 2,848,820 A * | 8/1958 | Wallin et al. | .................... | 34/461 |
| 3,180,688 A * | 4/1965 | Futer | ................................ | 406/88 |
| 3,385,490 A * | 5/1968 | Bo Malmgren et al. | .......... | 226/7 |
| 3,437,469 A * | 4/1969 | Bourgeaux et al. | ............. | 65/25.2 |
| 3,449,102 A * | 6/1969 | Chaumont et al. | .............. | 65/25.2 |
| 3,455,669 A * | 7/1969 | McMaster et al. | ............ | 65/182.2 |
| 3,773,391 A * | 11/1973 | Crandall et al. | ................ | 406/88 |
| 4,081,201 A * | 3/1978 | Hassan et al. | ................... | 406/88 |
| 5,209,387 A * | 5/1993 | Long et al. | .................... | 226/97.3 |
| 5,299,890 A * | 4/1994 | Spatafora et al. | ............... | 406/88 |
| 5,439,341 A * | 8/1995 | Yamazaki et al. | ............. | 414/676 |
| 5,951,006 A * | 9/1999 | Biegelsen et al. | .............. | 271/195 |
| 6,042,307 A * | 3/2000 | Lenhart | ............................ | 406/88 |
| 6,781,684 B1 * | 8/2004 | Ekhoff | ........................ | 356/237.1 |
| 6,805,318 B2 * | 10/2004 | Ebner | ........................ | 242/615.11 |
| 6,808,358 B1 * | 10/2004 | Mayerberg et al. | ........... | 414/676 |
| 7,080,962 B1 * | 7/2006 | Kruse | ................................ | 406/93 |
| 2006/0054774 A1 * | 3/2006 | Yassour et al. | ................. | 248/631 |
| 2006/0239808 A1 * | 10/2006 | Ludwig et al. | ................. | 414/676 |
| 2007/0195653 A1 * | 8/2007 | Yassour et al. | ............. | 369/13.24 |

* cited by examiner

*Primary Examiner* — Terrell McKinnon
*Assistant Examiner* — Bradley Duckworth
(74) *Attorney, Agent, or Firm* — McKenna Long & Aldridge, LLP.

(57) ABSTRACT

There is provided a support platform of a non-contact transfer apparatus. The support platform of a non-contact transfer apparatus includes a plurality of first holes each having a plurality of sub-holes arranged in a radial direction and a plurality of second holes arranged in a line proximate the first holes.

13 Claims, 7 Drawing Sheets

SUPPORT PLATFORM OF NON-CONTACT TRANSFER APPARATUS

CROSS-REFERENCE TO RELATED PATENT APPLICATION

This application claims the benefit of Korean Patent Application No. 10-2005-0052916, filed on Jun. 20, 2005, which is hereby incorporated by reference for all purposes as if fully set forth herein.

BACKGROUND OF THE INVENTION

1. Field of the Invention

The present invention relates to a support platform of a non-contact transfer apparatus, and more particularly, to a support platform that can transfer objects in a non-contact state.

2. Discussion of the Related Art

Generally, in order to manufacture a semiconductor integrated circuit or a display panel, an object (for example, a substrate) undergoes a plurality of processes.

In order to transfer the object from one process to another process, a transfer apparatus is used. Recently, a transfer apparatus that can efficiently transfer an object has been studied.

The transfer apparatuses may be classified into contact transfer apparatuses that can transfer an object in a state where the object directly contacts a support platform and non-contact transfer apparatuses that can transfer an object in a state where the object is lifted by air pressure.

In the case of the contact transfer apparatus, since the object is transferred in a state where it contacts the support platform, the object may be scratched due to friction between the object and the support platform or broken. In the case of the non-contact transfer apparatus, since the object is transferred without contacting the support platform, the damage to the object can be minimized or prevented and the pollution of the object by foreign objects can be lowered. Furthermore, there is no electrostatic problem caused by the contact between the object and the support platform.

Because of the benefits of a non-contact apparatus, the non-contact transfer apparatus has been more actively studied.

Figure 1:
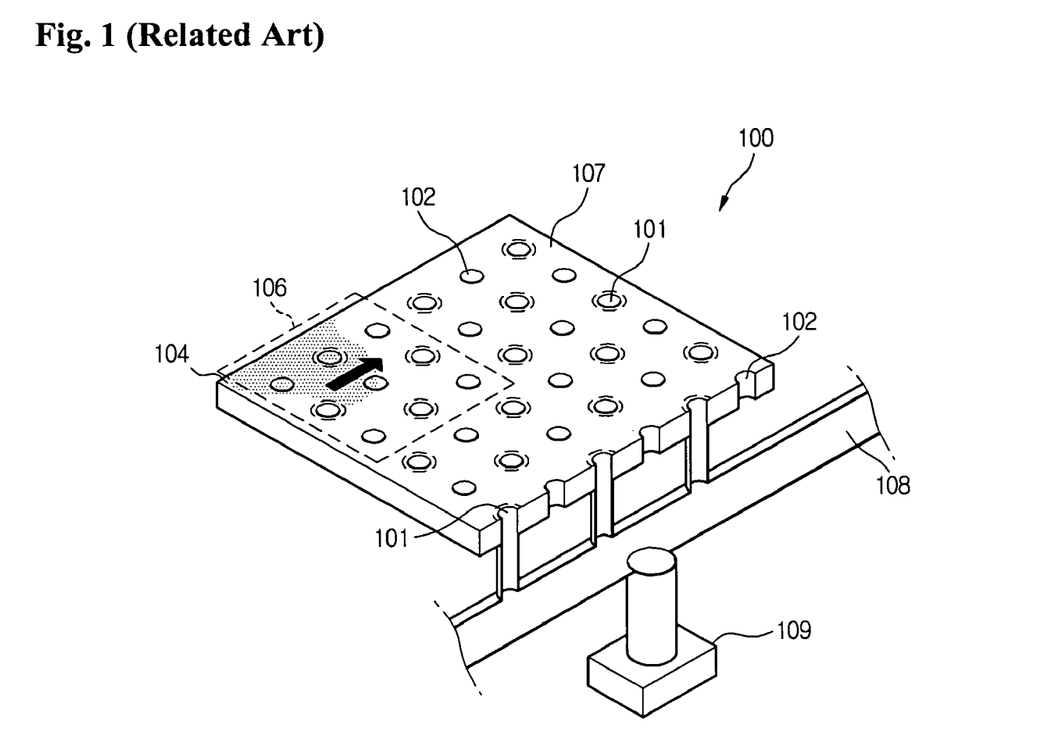
FIG. 1 is a schematic perspective view of a support platform of a non-contact transfer apparatus according to the related art.

FIG. 1 shows a support platform of a non-contact transfer apparatus according to the related art of the present invention.

In FIG. 1, a related art support platform 100 of a non-contact transfer apparatus includes a plurality of unit cells each having a chess-table format. The unit cells are provided with a plurality of air intake hole portions 101 and a plurality of air exhaust holes 102. Air is sprayed toward an object 106 through the air intake hole portions 101 and is then exhausted to an external side through the air exhaust holes 102.

When the object 106 that may have a size equal to, greater or less than that of an active surface 107 of the platform 100 is arranged in parallel close to the active surface 107, an air cushion 104 is formed between a bottom surface of the object 106 and the active surface 107. The air cushion 104 provides an intensity of the pressure for uniformly lifting the object 106. The intensity of the pressure depends on an amount of air introduced through the air intake hole portions 101 and an amount of air exhausted through the air exhaust holes 102.

The object 106 may be transferred in a direction of the arrow in FIG. 1.

The air intake hole portions 101 are connected to a pressure storing unit 108 connected to an air pump 109. Therefore, the air sucked by the air pump 109 is stored in the pressure storing unit 108 and is then sprayed through the air intake hole portions 101. The sprayed air forms the air cushion 104 to transfer the object in a state where the object 106 is lifted from the active surface 107 of the platform 100 by a predetermined interval.

In the non-contact transfer apparatus of the related art, since each air intake hole 101 through which the air is introduced has a predetermined diameter, a large amount of air is consumed to form the air cushion 104 on the active surface 107, thereby increasing process costs.

In addition, the pressure at a the central portion of the support platform is greater than that at a peripheral portion of the support platform. That is, the pressure distribution is not uniform throughout the active surface of the support platform. Therefore, the object lifted from the platform may jolt or collide with a peripheral of the object. This causes damage to the object.

SUMMARY OF THE INVENTION

Accordingly, the present invention is directed to a support platform of a non-contact transfer apparatus that substantially obviates one or more problems due to limitations and disadvantages of the related art.

An advantage of the present invention is to provide a support platform of a non-contact transfer apparatus that can dramatically reduce the consumption of air.

Another advantage of the present invention is to provide a support platform of a non-contact transfer apparatus that can stably transfer an object.

Additional advantages and features of the invention will be set forth in part in the description which follows, and in part will become apparent from the description, or may be learned by practice of the invention. These and other advantages of the invention may be realized and attained by the structure particularly pointed out in the written description and claims hereof as well as the appended drawings.

To achieve these and other advantages and in accordance with the purpose of the invention, as embodied and broadly described herein, there is provided a support platform of a non-contact transfer apparatus, including: a plurality of first holes each having a plurality of sub-holes arranged in a radial direction; and a plurality of second holes arranged in a line proximate the first holes.

In another aspect of the present invention, there is provided a support platform of a non-contact transfer apparatus, including: a plurality of first pads on each of which a plurality of first holes having a plurality of sub-holes arranged in a radial direction are formed; and a plurality of second pads on each of which a plurality of second holes are formed, the second pads being arranged in an alternating pattern with the first pads.

In another aspect of the present invention, there is provided a support platform of a non-contact transfer apparatus, comprising: a plurality of first pads having a plurality of first holes, each hole having a plurality of sub-holes arranged in a radial direction; and a plurality of second pads on each of which a rectangular slot is formed, the second pads being arranged in an alternating pattern with the first pads.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principles of the invention. In the drawings.

DETAILED DESCRIPTION OF THE ILLUSTRATED EMBODIMENTS

Reference will now be made in detail to embodiments of the present invention, examples of which are illustrated in the accompanying drawings. Wherever possible, the same reference numbers will be used throughout the drawings to refer to the same or like parts.

Figure 2A:
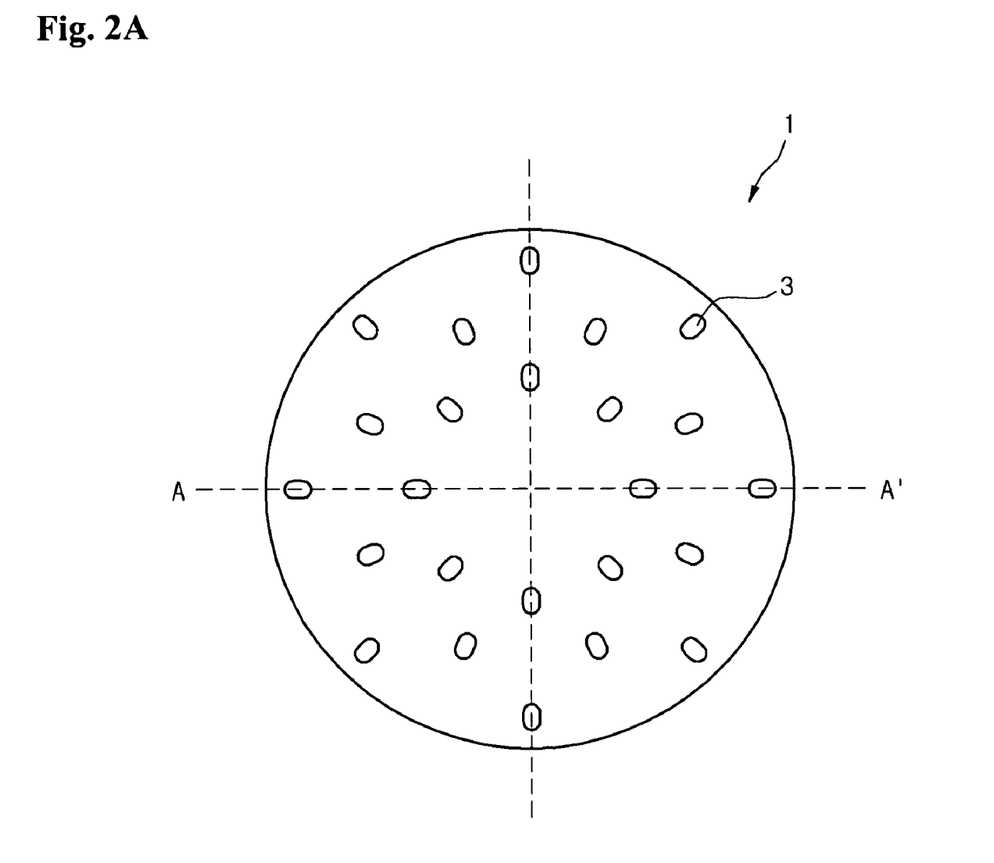
FIG. 2A is a top view illustrating an air intake hole portion of a support platform of a non-contact transfer apparatus of the present invention.
Figure 2B:
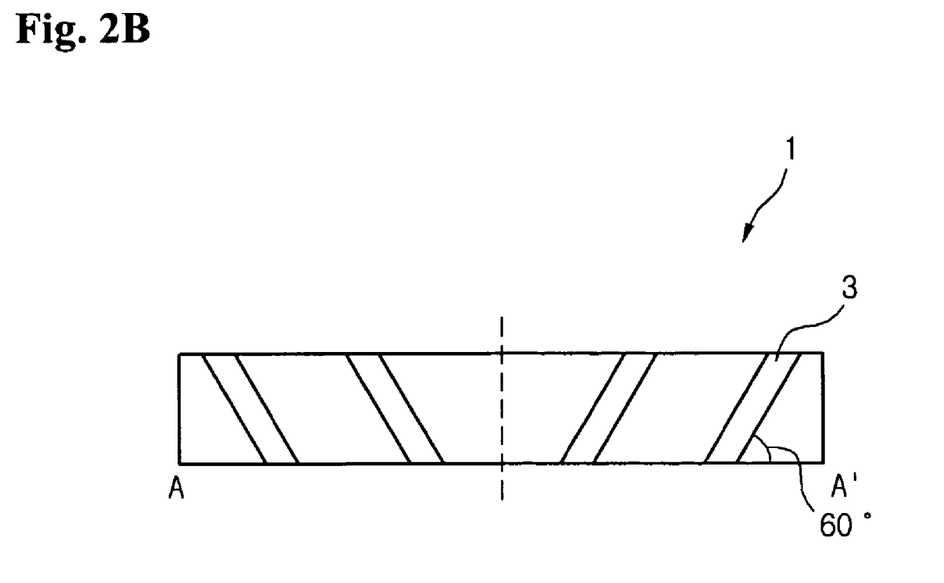
FIG. 2B is a sectional view taken along line A-A' of FIG. 2A.

FIGS. 2A and 2B are respective top and sectional views illustrating an air intake hole portion of a support platform of a non-contact transfer apparatus of the present invention.

In FIG. 2A, an air intake hole portion 1 of a support platform includes a plurality of sub-holes 3. The number and locations of the sub-holes 3 formed on a left or lower half of the air intake hole portion 1 are identical to those of the sub-holes 3 formed on a right or upper half of the air intake hole portion 1. That is, the sub-holes 3 are symmetrically formed with reference to a centerline of the air intake hole portion 1. Air is introduced upwardly through the sub-holes 3. The sub-holes 3 may be formed in a substantially rectangular shape, a substantially oval shape, a substantially circular shape, or a polygonal shape.

In FIG. 2B, the sub-holes 3 are inclined at a predetermined angle relative to a bottom surface of the support platform. The inclination of the sub-hole 3 may vary according to a size, shape and weight of an object that will be transferred. For example, the sub-hole 3 may be inclined at about 50-70°, preferably 60°, to the surface of the support platform. At this point, the sub-holes 3 are symmetrically formed and inclined with reference to the centerline of the air intake hole portion 1.

Each sub-hole 3 of the air intake hole portion 1 has a minimum diameter. Therefore, the flow rate of the air passing through the sub-holes 3 increases. Thus, even when a relatively small amount of air is introduced through the sub-holes, a desired air pressure can be maintained due to the increased flow rate of the air. As a result, the desired air pressure can be realized using the relatively small amount of air, thereby reducing the process costs. In addition, since the sub-holes 3 are symmetrically formed and inclined with reference to the centerline of the support platform, the air can be uniformly distributed on the support platform.

An inventive support platform having the above-described air intake hole portions will now be described.

Figure 3:
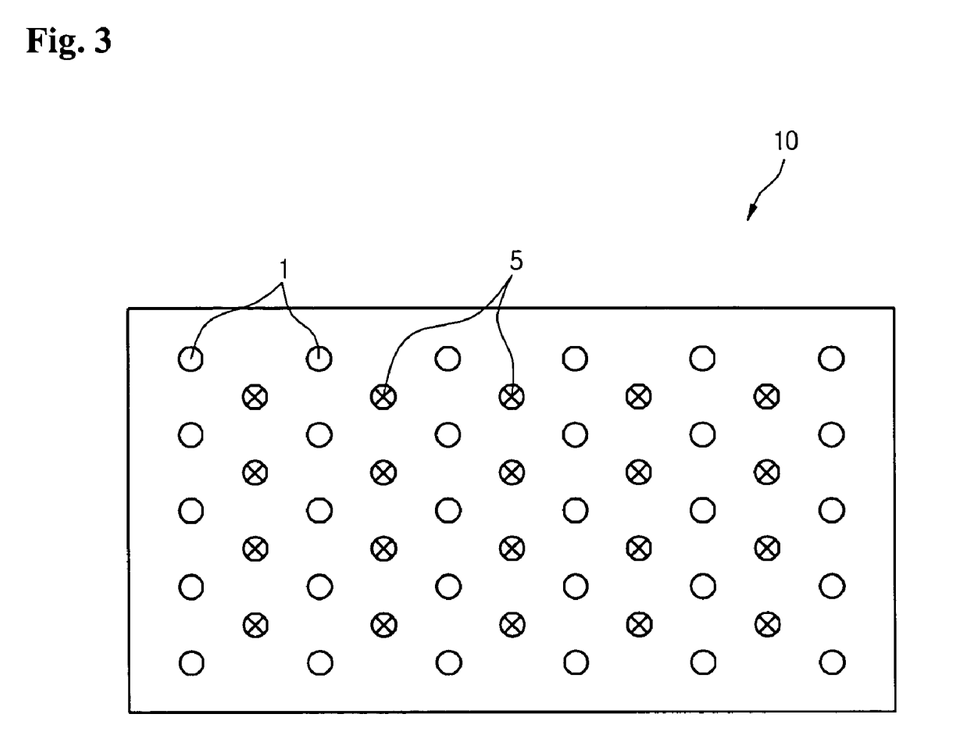
FIG. 3 is a schematic top view of a support platform of a non-contact transfer apparatus according to a first embodiment of the present invention.

FIG. 3 is a schematic top view of a support platform of a non-contact transfer apparatus according to a first embodiment of the present invention.

As shown in FIG. 3, a support platform of this embodiment includes a guide pad 10 on which a plurality of air intake hole portions 1 are formed along a plurality of lines. A plurality of sub-holes (3 of FIG. 2A) are radially formed through each air intake hole portion 1. A plurality of air exhaust holes 5 are formed along lines between the lines of the air intake hole portions 1. That is, the lines on which the air intake hole portions 1 are formed alternate with the lines on which the air exhaust holes 5 are formed. Air is introduced upwardly through the air intake hole portions 1 to transfer the object in a state where the object is lifted from the surface of the guide pad 10. Then, the air is exhausted downwardly through the air exhaust holes 5.

Unlike the guide pad 10 of FIG. 3, a guide pad on which the air intake hole portions 1 and the air exhaust holes 5 are formed in a chess-table format may be provided. An important feature of this embodiment, the air intake hole portion 1 is identical to that described with reference to FIGS. 2A and 2B.

According to this embodiment, since the air is uniformly introduced through the air intake hole portions 1, the object can be stably transferred without jolting. In addition, since the diameters of the sub-holes are relatively small, the flow rate of the air increases. This enables a reduction in the amount of air to be consumed, thereby reducing process costs.

Figure 4:
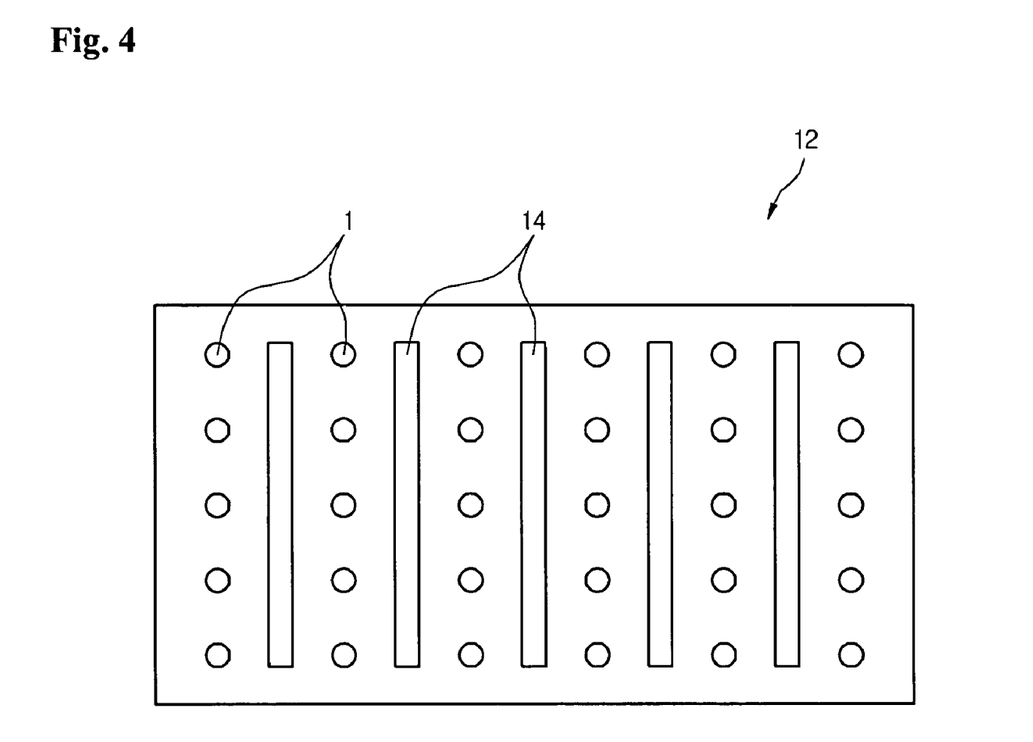
FIG. 4 is a schematic top view of a support platform of a non-contact transfer apparatus according to a second embodiment of the present invention.

FIG. 4 is a schematic top view of a support platform of a non-contact transfer apparatus according to a second embodiment of the present invention.

As shown in FIG. 4, a support platform of this embodiment includes a guide pad 12 on which a plurality of air intake hole portions 1 are formed along a plurality of lines. A plurality of sub-holes (3 of FIG. 2A) are radially formed through each air intake hole portion 1. A plurality of substantially rectangular slots 14 are formed along lines between the lines of the air intake hole portions 1. That is, the lines on which the substantially rectangular slots are formed alternate with the rectangular slots 14.

By using the substantially rectangular slots 14, the air introduced through the air intake hole portions 1 can be more effectively exhausted, thereby preventing air pressure formed by the introduced air from excessively increasing and providing a stable air cushion.

According to this embodiment, since the air is uniformly introduced through the air intake hole portions 1, the object can be stably transferred without jolting. In addition, since the diameters of the sub-holes are relatively small, the flow rate of the air increases. This enables to reduce the amount of air to be consumed, thereby reducing the process costs.

Figure 5:
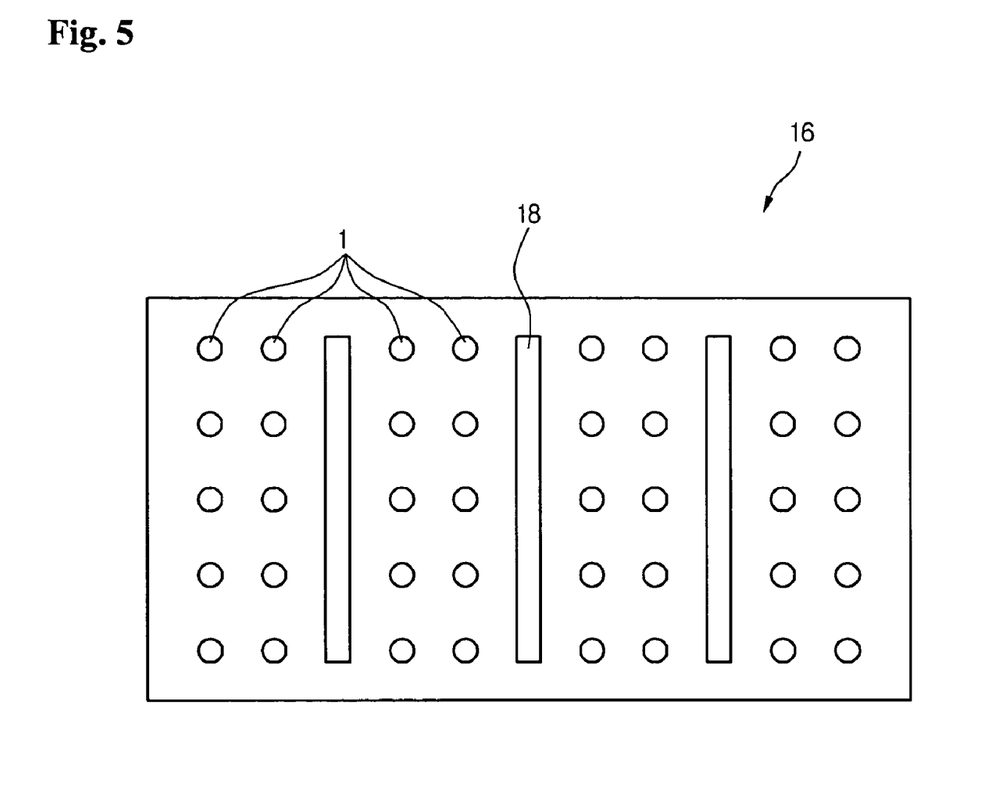
FIG. 5 is a schematic top view of a transfer apparatus having a support platform according to a third embodiment of the present invention.

FIG. 5 is a schematic top view of a transfer apparatus having a support platform according to a third embodiment of the present invention.

In FIG. 5, a support platform includes a guide pad 16 on which a plurality of air intake hole portions 1 are formed along a plurality of lines.

In this embodiment, the lines along which the air intake hole portions 1 are formed such that each group includes one or more lines. A plurality of substantially rectangular slots 18 are formed along lines between the groups each including one or more lines along which the intake hole portions are formed.

Alternatively, the lines along which the air intake hole portions 1 are formed may be grouped such that each group includes one or more lines and the lines along which the substantially rectangular slots are formed are also grouped such that each group includes one or more lines. The groups for the air intake hole portions 1 are arranged to alternate with the groups for the substantially rectangular slots 18.

Alternatively, the lines along which the substantially rectangular slots are formed are grouped such that each group includes one or more lines and the groups are disposed between the lines along which the air intake hole portions are formed.

As described above, a variety of support platforms can be applied in accordance with a peripheral environment or a size, shape and weight of the object.

In the aforementioned embodiments, the air intake hole portions and the air exhaust holes or the rectangular slots are formed on an integral support platform.

As the display panel is large-sized, the support platform must be also large-sized to transfer the large-sized panel. However, it is difficult to process the air intake hole portions and the air exhaust holes or the rectangular slots on the large-sized support platform.

To solve the problem, the support platform is formed of a plurality of pads and the air intake hole portions and the air exhaust holes or the rectangular slots are formed on the pads.

Figure 6:
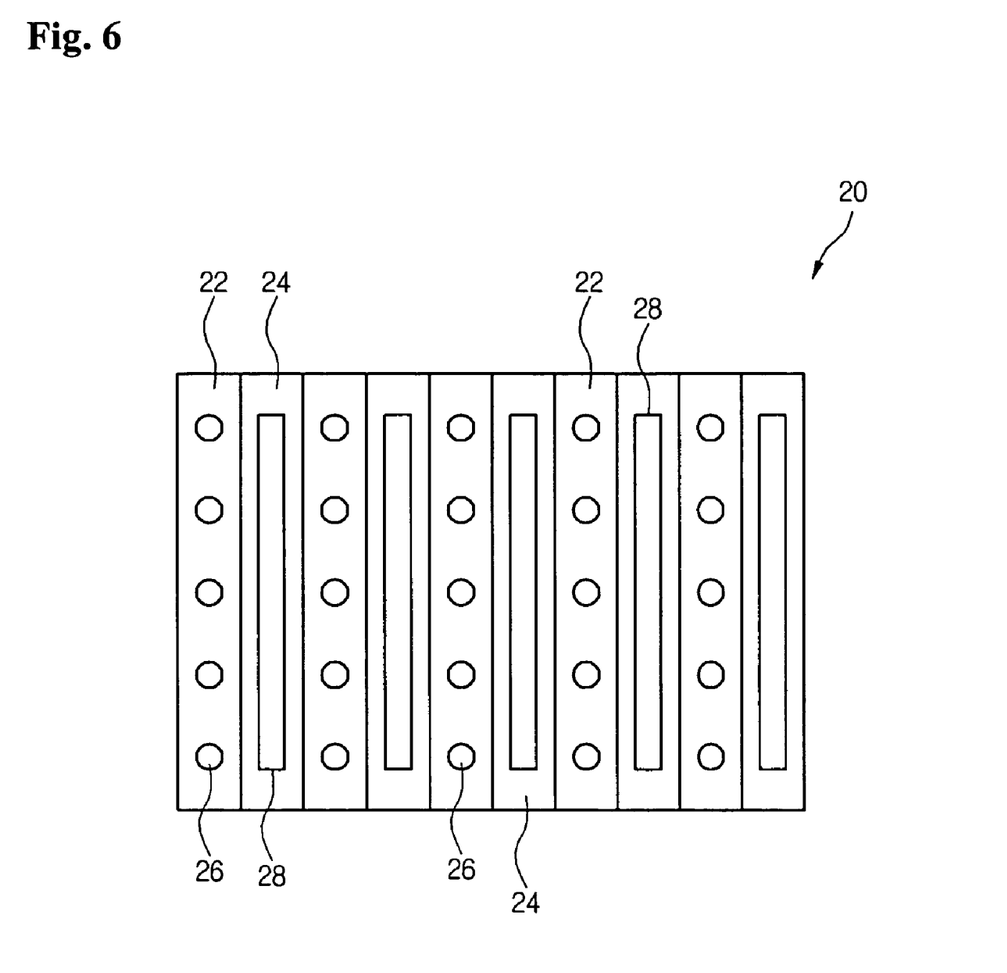
FIG. 6 is a schematic top view of a transfer apparatus having a support platform according to a fourth embodiment of the present invention.

FIG. 6 is a schematic top view of a transfer apparatus having a support platform according to a fourth embodiment of the present invention.

In FIG. 6, a support platform includes a guide pad 20 having a plurality of air pads 22 on each of which a plurality of air intake hole portions 26 are formed and a plurality of dummy pads 24 on each of which a plurality of exhaust holes (not shown) or a substantially rectangular slot 20 is formed. The air and dummy pads 22 and 24 may be formed of an identical material or different materials. The air pads 22 and the dummy pads 24 are arranged in an alternating pattern and connected to each other. The plurality of air intake hole portions 26 on each air pad 22 may be formed along one or more lines. The plurality of air exhaust holes 28 or the substantially rectangular slot on each dummy pad 24 may be formed along one or more lines.

The air pads 22 and the dummy pads 24 may be coupled to each other by, for example, screws or adhesive.

This fourth embodiment may be applied when it is desired to enlarge the size of the support platform and to enjoy the advantages of the first to third embodiments.

According to the present invention, since the air intake hole portion has a plurality of sub-holes arranged in a radial direction and inclined at a predetermined angle, the consumption of the air can be reduced and the object can be stably transferred. Furthermore, since the support platform can be formed by combining pads, a large-sized support platform can be provided to transfer the large-sized object.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A support platform of a non-contact transfer apparatus, comprising:
    a plurality of air intake hole portions that direct air toward a lower side of an object to support the object, each air intake hole portion having a plurality of sub-holes symmetrically arranged along a radial direction from a center portion of each air intake hole portion to an edge portion of each air intake hole portion; and
    a plurality of air exhaust holes arranged in a line proximate the air intake hole portions,
    wherein the sub-holes pass between an upper surface and a bottom surface of the support platform,
    wherein the sub-holes of each air intake hole portion are symmetrically formed in a radiating circular pattern with reference to a centerline of each air intake hole portion, and
    wherein the sub-holes are inclined at an angle in a range of about 50 to 70 degrees toward the center line of each air intake hole portion and relative to the bottom surface of the support platform.

2. The support platform according to claim 1, wherein the sub-holes are formed to have a shape of one of a substantially rectangular shape, a substantially oval shape and a circular shape.

3. The support platform according to claim 1, wherein the air exhaust holes are substantially rectangular slots.

4. The support platform according to claim 1, wherein the air intake hole portions are formed along first lines and the air exhaust holes are formed along second lines located between the first lines.

5. The support platform according to claim 1, wherein the air intake hole portions are formed along first lines and the air exhaust holes are formed along second lines, wherein the second lines are grouped such that each group has one or more second lines and the groups are alternately arranged with the first lines.

6. The support platform according to claim 1, wherein the air intake hole portions are formed along first lines and the air exhaust holes are formed along second lines, wherein the first lines are grouped such that each group has one or more first lines and the groups are alternately arranged with the second lines.

7. The support platform according to claim 1, wherein the air intake hole portions are formed along first lines and the air exhaust holes are formed along second lines, wherein the first lines are grouped such that each group has one or more first lines, the second lines are grouped such that each group has one or more second lines, and the groups of the first lines are alternately arranged with the groups of the second lines.

8. The support platform according to claim 1, wherein the air intake hole portions and the air exhaust holes are formed in a chess table format.

9. A support platform of a non-contact transfer apparatus, comprising:
    a plurality of first pads on each of which a plurality of air intake hole portions are formed, each air intake hole portion directing air upwardly to support an object and having a plurality of sub-holes symmetrically arranged along a radial direction from a center portion of each air intake hole portion to an edge portion of each air intake hole portion; and
    a plurality of second pads on each of which a plurality of air exhaust holes are formed, the second pads being arranged in an alternating pattern with the first pads,
    wherein the sub-holes pass between an upper surface and a bottom surface of the support platform,
    wherein the sub-holes of each air intake hole portion are symmetrically formed in a radiating circular pattern with reference to a centerline of each air intake hole portion, and
    wherein the sub-holes are inclined at an angle in a range of about 50 to 70 degrees toward the center line of each air intake hole portion and relative to the bottom surface of the support platform.

10. The support platform according to claim 9, wherein the first pads are coupled to the second pads by one of screws and an adhesive.

11. The support platform according to claim 9, wherein the sub-holes are formed in a shape selected from the group consisting of a substantially rectangular shape, an oval shape and a circular shape.

12. A support platform of a non-contact transfer apparatus, comprising:

a plurality of first pads each having a plurality of air intake hole portions that directs air toward a lower side of an object to support the object, each air intake hole portion having a plurality of sub-holes symmetrically arranged along a radial direction from a center portion of each air intake hole portion to an edge portion of each air intake hole portion; and a plurality of second pads on each of which a rectangular slot is formed, the second pads being arranged in an alternating pattern with the first pads, wherein the sub-holes pass between an upper surface and a bottom surface of the support platform, wherein the sub-holes of each air intake hole portion are symmetrically formed in a radiating circular pattern with reference to a centerline of each air intake hole portion, and wherein the sub-holes are inclined at an angle in a range of about 50 to 70 degrees toward the center line of each air intake hole portion and relative to the bottom surface of the support platform.

13. The support platform according to claim 12, wherein the first pads are coupled to the second pads by one of screws and adhesive.

* * * * *